United States Patent
Rosen

(10) Patent No.: US 10,033,961 B2
(45) Date of Patent: *Jul. 24, 2018

(54) STORAGE SYSTEM USING UNFORMATTED DIGITAL OPTICAL TAPE

(71) Applicant: Group 47, Inc., Woodland Hills, CA (US)

(72) Inventor: Daniel Scott Rosen, Thousand Oaks, CA (US)

(73) Assignee: Group 47, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,611

(22) Filed: Sep. 20, 2016

(65) Prior Publication Data

US 2017/0013229 A1    Jan. 12, 2017

Related U.S. Application Data

(63) Continuation-in-part of application No. 14/919,530, filed on Oct. 21, 2015, now Pat. No. 9,640,214, which
(Continued)

(51) Int. Cl.
*G11B 7/003* (2006.01)
*G11B 7/007* (2006.01)
(Continued)

(52) U.S. Cl.
CPC ......... *H04N 5/843* (2013.01); *G06K 9/00744* (2013.01); *G11B 5/584* (2013.01); *G11B 7/003* (2013.01); *G11B 7/007* (2013.01); *G11B 7/0045* (2013.01); *G11B 7/00736* (2013.01); *G11B 7/0901* (2013.01); *G11B 7/0938* (2013.01);
(Continued)

(58) Field of Classification Search
CPC ....... G11B 5/584; G11B 5/581; G11B 5/1825; G11B 15/6835; G11B 15/6885; G11B 2005/0005; G11B 20/10009; G11B 21/10; G11B 2220/90; G11B 27/107; G11B 27/3027; G11B 5/00813; G11B 5/5504; G11B 5/5508; G11B 5/78; G11B 7/0033; G11B 7/013; G11B 21/103; G11B 7/0901; G11B 7/0938; G11B 7/14; G11B 7/24009; G11B 7/24085; G06F 3/0643; G06F 3/0682

See application file for complete search history.

(56) References Cited

U.S. PATENT DOCUMENTS 4,052,741 A    10/1977    Baca et al.
5,311,380 A     5/1994    Murata et al.
(Continued)

*Primary Examiner* — Dionne H Pendleton
(74) *Attorney, Agent, or Firm* — SoCal IP Law Group LLP; Angelo Gaz; John E. Gunther

(57) ABSTRACT

Digital optical tape archival storage systems and methods are disclosed. A digital optical tape recorder simultaneously writes data and two or more guide tracks onto an unformatted digital optical tape recording medium. A digital optical tape reader includes a camera and an image processor. The camera captures a two-dimensional image of the digital optical tape recording medium including the data and the two or more guide tracks. The image processor extracts the data from the two-dimensional image based, at least in part, on the guide tracks.

12 Claims, 6 Drawing Sheets

Related U.S. Application Data is a continuation-in-part of application No. 14/260,258, filed on Apr. 23, 2014, now Pat. No. 9,208,813.

(60) Provisional application No. 61/815,650, filed on Apr. 24, 2013.

(51) Int. Cl.

| | | |
|---|---|---|
| *G11B 5/584* | (2006.01) | |
| *H04N 5/84* | (2006.01) | |
| *G11B 7/0045* | (2006.01) | |
| *G06K 9/00* | (2006.01) | |
| *H04N 5/77* | (2006.01) | |
| *H04N 9/87* | (2006.01) | |
| *G11B 27/30* | (2006.01) | |
| *G11B 15/18* | (2006.01) | |
| *G11B 21/10* | (2006.01) | |
| *G11B 7/09* | (2006.01) | |
| *G11B 27/10* | (2006.01) | |
| *G11B 7/13* | (2012.01) | |

(52) U.S. Cl.
CPC ............ *G11B 7/13* (2013.01); *G11B 15/18* (2013.01); *G11B 15/1825* (2013.01); *G11B 21/10* (2013.01); *G11B 21/103* (2013.01); *G11B 27/107* (2013.01); *G11B 27/30* (2013.01); *H04N 5/77* (2013.01); *H04N 9/87* (2013.01)

(56) References Cited

U.S. PATENT DOCUMENTS

| | | |
|---|---|---|
| 5,321,683 A | 6/1994 | Olczak |
| 5,384,664 A | 1/1995 | Koehler |
| 5,432,652 A | 7/1995 | Comeaux et al. |
| 5,519,517 A * | 5/1996 | Redfield ............ G11B 7/003 359/22 |
| 5,771,131 A | 6/1998 | Pirzadeh |
| 5,896,403 A | 4/1999 | Nagasaki et al. |
| 5,930,065 A | 7/1999 | Albrecht et al. |
| 6,025,859 A | 2/2000 | Ide et al. |
| 6,084,626 A | 7/2000 | Ramanujan et al. |
| 6,341,118 B1 * | 1/2002 | Drobot ............... G11B 7/124 369/112.27 |
| 6,456,793 B1 | 9/2002 | Ray et al. |
| 6,605,330 B2 | 8/2003 | Tyan et al. |
| 6,690,636 B1 | 2/2004 | Marchant |
| 6,700,732 B1 * | 3/2004 | Indeck ............... B25J 9/1697 360/110 |
| 6,791,914 B1 * | 9/2004 | Marchant ............ G11B 7/003 369/44.26 |
| 7,171,740 B2 | 2/2007 | Biskenbom |
| 7,248,278 B1 | 7/2007 | Carlisle et al. |
| 7,286,155 B1 | 10/2007 | Trisnadi et al. |
| 7,940,448 B2 | 5/2011 | Bloom et al. |
| 2002/0105888 A1 * | 8/2002 | Levich ............ G11B 7/24085 369/94 |
| 2002/0167751 A1 | 11/2002 | Lee et al. |
| 2005/0002550 A1 | 1/2005 | Jabri et al. |
| 2007/0104037 A1 * | 5/2007 | Monen ............... G11B 7/003 369/13.37 |
| 2010/0172045 A1 | 7/2010 | Goodman et al. |
| 2011/0098722 A1 | 4/2011 | Ulfarsson et al. |
| 2012/0026856 A1 | 2/2012 | Shimada et al. |
| 2014/0321255 A1 | 10/2014 | Rosen |
| 2015/0055245 A1 | 2/2015 | Finn |
| 2015/0098636 A1 | 4/2015 | Bergman et al. |

\* cited by examiner

STORAGE SYSTEM USING UNFORMATTED DIGITAL OPTICAL TAPE

RELATED APPLICATION INFORMATION

This patent is a continuation-in-part of patent application Ser. No. 14/919,530 filed Oct. 21, 2015, titled DIGITAL OPTICAL TAPE STORAGE SYSTEM, now U.S. Pat. No. 9,640,214, which is a continuation-in-part of patent application Ser. No. 14/260,258 filed Apr. 23, 2014, titled DIGITAL OPTICAL TAPE STORAGE SYSTEM, now U.S. Pat. No. 9,208,813, which claims priority from provisional patent application No. 61/815,650, filed Apr. 24, 2013, titled DIGITAL OPTICAL TAPE ARCHIVAL STORAGE SYSTEM, all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data storage on digital optical tape.

Description of the Related Art

Color photographic recording film is unsuitable for long-term archival storages of motion pictures and other imagery. Color film contains photographically active chemicals which remain in the film after development. These chemicals will continue to undergo chemical reactions which cumulatively cause color fading in the images.

Conventional magnetic recording media are typically produced using a continuous wet coating process, where a magnetic dispersion is applied to the base film. This magnetic dispersion consists of binders, magnetic pigments, dispersants and lubricants which are dissolved in organic solvents to form a slurry. These binders (along with residual solvent, dispersants, etc.) will, over time, undergo chemical processes which may weaken their ability to hold the magnetic pigments to the base media or may cause breakdown of the magnetic pigments themselves due to chemical reactions. Thus magnetic storage media may also be unsuitable for archival storage of images and other data.

Digital optical tape system (DOTS) recording medium based on a very stable, very sensitive phase-change recording material has a potential for archival storage of imagery, data, and documents for periods in excess of 100 years. It has been shown that DOTS recording medium is stable for 100 years at 38° C. and over 200 years at room temperature (25° C.). Further, DOTS recording medium is immune to chemical, water, and other environmental damage and is impervious to corrosion.

As described in U.S. Pat. No. 6,505,330, DOTS recording medium may be formed by coating an alloy of Antimony, Tin, and one or more additional metals onto a polymer film. The DOTS recording medium may be coated on the film using a physical vapor deposition (PVD) process such as, for example, DC magnetron sputtering. The film may be a dimensionally stable polymer material such as, for example, polyethylene terephthalate (PET), commercially known as Mylar® or Estar®. The DOTS recording medium may have a thickness of about 0.08 μm and may be protected by an SiOx overcoat of about 0.095 μm thickness.

In contrast to conventional magnetic tape, a PVD coating technique does not require chemical binders or solvents and yields strong adhesion between the recording material and the base film. Thus DOTS recording medium is believed to be relatively immune to mechanical failures such as delamination, chemical creep, fading, etc. suffered by conventional magnetic media over extended time periods.

Data may be written onto the DOTS recording medium by localized heating using a laser or other energy source. For example, U.S. Pat. No. 7,248,278 describes a printing system that may be suitable for writing data onto the DOTS recording medium. A linear spatial light modulator is illuminated by an expanded laser beam, and an image of the spatial light modulator is projected onto a photosensitive surface, which could be the DOTS recording medium.

Recorded data may be read from the DOTS recording medium by detecting the localized optical reflectivity of the media. For example, U.S. Pat. No. 5,321,683 describes a system for reading the DOTS recording medium. A line of data on the DOTS recording medium is illuminated by a linearly expanded laser beam, and an image of the DOTS recording medium is projected onto a detector array.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
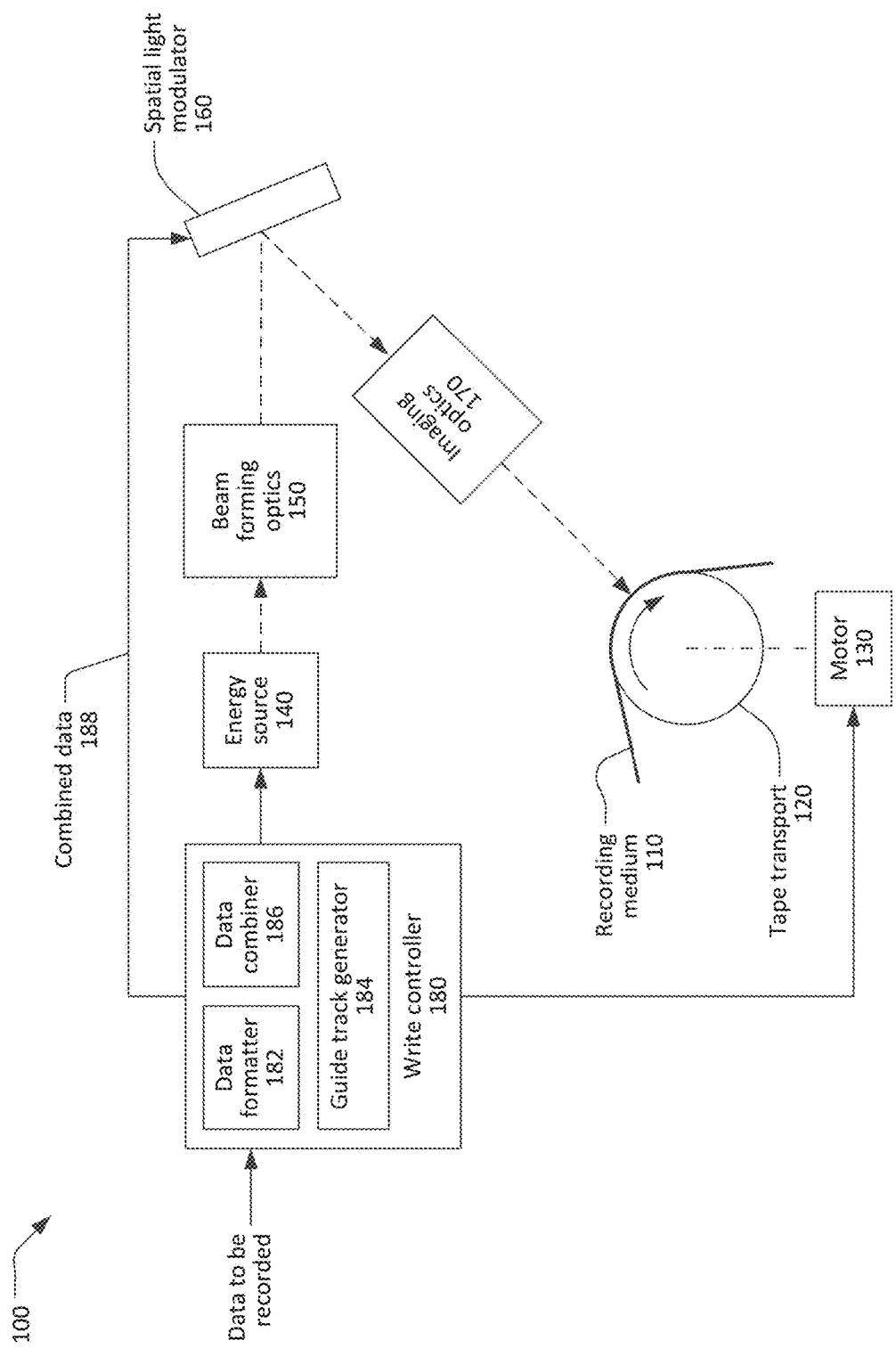
FIG. 1 is a schematic block diagram of a digital optical tape recording system.

Referring now to FIG. 1, a digital optical tape recorder 100 may be used to write data onto a DOTS recording medium 110. The DOTS recording medium 110 may be unformatted, which is to say the DOTS recording medium 110 does not contain guide tracks, fiducial marks, or any other recorded features prior to being recorded on by the digital optical tape recorder 100.

The digital optical tape recorder 100 may include an energy source 140, beam forming optics 150 to direct light from the energy source 140 onto a spatial light modulator 160, and imaging optics 170 to project an image of the spatial light modulator 160 onto the DOTS recording medium 110. The DOTS recording medium 110 may be continuously or intermittently advanced by a tape transport 120 driven by at least one motor 130. The tape transport 120 is represented schematically in FIG. 1 as a capstan, but does not necessarily include a capstan. The tape transport 120 may include a supply tape reel, a take-up tape reel, and other components not shown in FIG. 1. The motor 130, the energy source 140, and the spatial light modulator 160 may be controlled by a write controller 180.

The energy source 140 may be a pulsed energy source providing periodic energy pulse width suitable for writing on the DOTS recording medium 110. For example, the energy pulse width may be 50 ns to 200 ns. The energy source 140 may be, for example, a laser having a wavelength from less than 405 nm to greater than 830 nm. The energy source 140 may be a plurality of lasers or an array of lasers.

The spatial light modulator 160 may be a linear array of light modulating elements. The spatial light modulator 160 may be, for example, a differential interferometric spatial light modulator as described in U.S. Pat. No. 7,940,448. The spatial light modulator 160 may be a diffractive spatial light modulator as described in U.S. Pat. No. 7,248,278. The spatial light modulator 160 may be a liquid crystal modulator or some other form of spatial light modulator. In any case, the spatial light modulator 160 may be configured to modulate a linear array of elements. The spatial light modulator may operate in a binary manner such that each element in the linear array of elements may be set to be either "on" or "off".

For example, the DOTS recording medium 110 may have a width of 12.7 mm (about one-half inch). Data bits may be recorded, for example, on the recording tape as 1 um diameter spots on 1.2 um centers. In this example, the spatial light modulator 160 may be a linear array of 10,000 elements to record 10,000 spots across a central 12 mm portion of the 12.7 mm tape width. The spatial light modulator 160 may have more or fewer than 10,000 elements. The recording tape width may be smaller or greater than 12.7 mm. The number of elements in the spatial light modulator 160 may be substantially different from 10,000 elements for recording tape widths other than 12.7 mm.

The beam forming optics 150 may accept energy emitted by the energy source 140 and form the energy into an elongate illumination spot directed onto the linear array of elements of the spatial light modulator 160. The beam forming optics 150 may include an anamorphic beam expander to create the elongate illumination spot. When the energy source 140 includes one or more lasers, the beam forming optics 150 may include one or more apodizers, integrators, or other optical elements to suppress the Gaussian beam profile emitted by the lasers and provide uniform power density across the illumination spot.

The imaging optics 170 may receive spatially modulated light from the spatial light modulator 160 and project an image of the spatial light modulator onto a surface of the DOTS recording medium 110. The width of the linear array of elements on the spatial light modulator 160 may be greater than or less than the width of the DOTS recording medium 110. In this case, the imaging optics 170 may provide magnification less than or greater than one, such that the image formed on the DOTS recording medium 110 is smaller than the linear array of elements on the spatial light modulator 160. The image formed on the recording tape may be a linear array of spots (more correctly potential spot locations), each of which is controlled by a corresponding element on the spatial light modulator 160. Since the DOTS recording medium 110 is initially unformatted, a portion of the elements of the spatial light modulator 160 may be dedicated to writing guide tracks and/or fiducial markers necessary to read the data recorded on the tape. Each element of the spatial light modulator 160 may be used as a binary switch having two states. In a first state, each element may direct light through the imaging optics 170 to write (i.e. to cause a phase change) the corresponding spot on the DOTS recording medium 110. In a second state, each element may direct no light, or substantially less light, to the corresponding spot on the DOTS recording medium 110 such that a phase change does not occur. Where necessary, the imaging optics 170 may include a polarizer, a beam splitter, an aperture, a spatial filter, and/or some other optical element to discriminate between the first and second states of the spatial light modulator.

A desirable feature of an archival data storage system is that the data be recoverable even if there is some physical degradation of the recording medium, such as warping or stretching of a tape recording media. To enable data recovery from physically degraded recording medium, data may be written on the recording media in a format that allows the data to be read without relying on precise mechanical attributes of the recording media.

Figure 2:
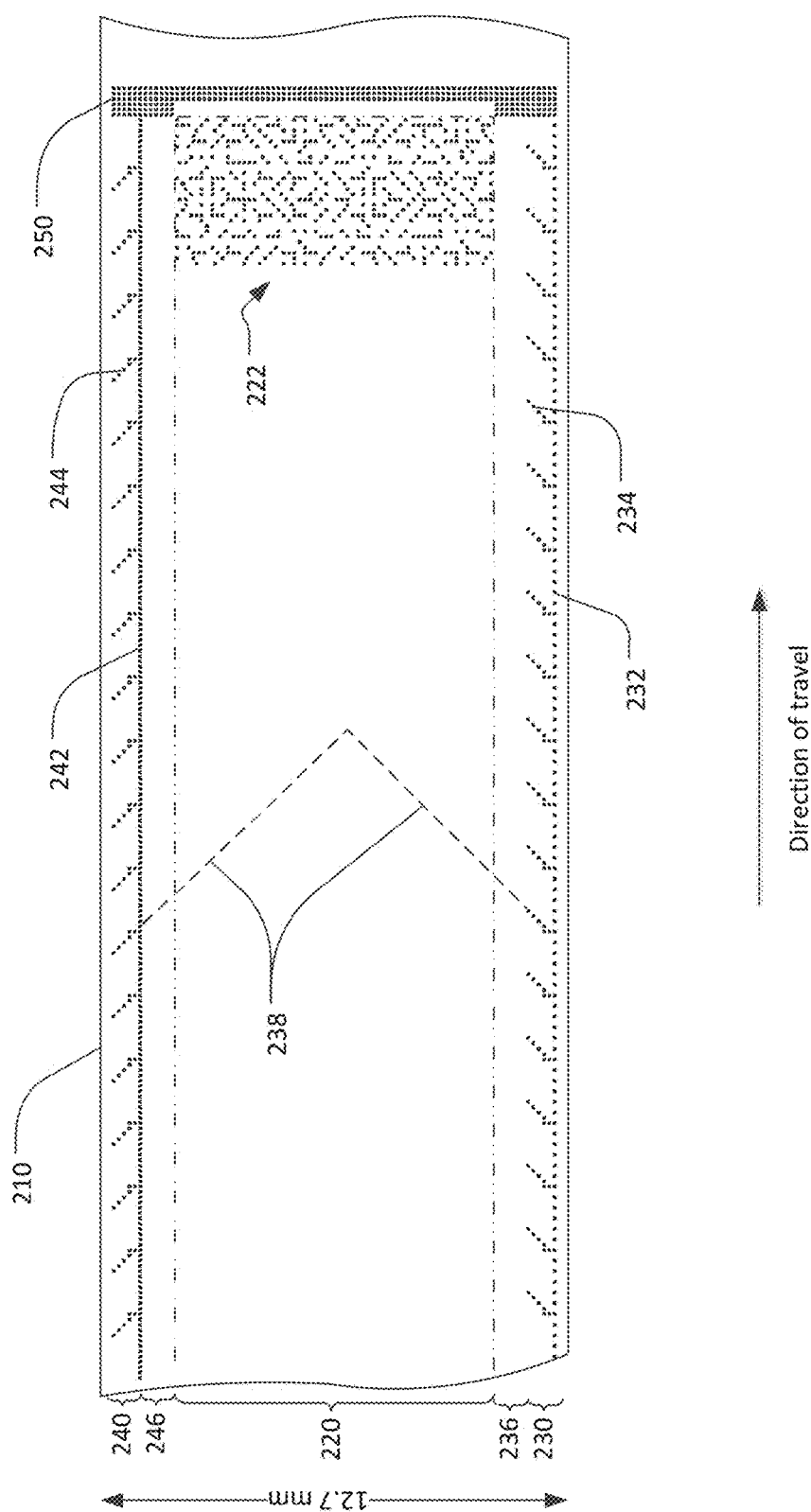
FIG. 2 is a graphical representation of data recorded on DOTS recording medium.

FIG. 2 shows an exemplary format for writing data on DOTS recording medium 210. Continuing the previous example, the width of the DOTS recording medium 210 may be 12.7 mm. A central portion 220 of the width of the DOTS recording medium 210 may be used for recording data 222 as an array of spots (not shown to scale) having either high or low reflectivity. For example, the data 222 may be written as a grid of 1 um diameter spots on 1.2 um centers. Each column of spots (as oriented in FIG. 3) in the central portion 220 may include, for example, 8192 spots representing 8192 binary bits of data.

Outside of the central portion 220 there may be two "dead bands" 236, 246 that are not normally recorded. Outside of the dead bands and inset 0.5 to 1 mm from the physical edge of the tape, may be two guide tracks 230, 240. The guide tracks 230, 240 may be written onto the media simultaneously with the data 222. The guide tracks 230, 240 may include fiducial markers for reading the data 222. In this context, a "fiducial marker" is an object written onto the digital optical tape recording medium for use as a reference when data recorded on the digital optical tape recording medium is read.

For example, each guide track 230, 240 may include a continuous line of spots extending along a length of the DOTS recording medium 210. As shown at 242, the continuous line of spots may include a spot exactly in line with every column of data. As shown at 232, the continuous line of spots may include a spot exactly in line with every other column of data. Additionally, each guide track 230, 240 may include additional spots that form diagonal lines 234, 244 at periodic interval along the length of the DOTS recording medium 210. Diagonal lines 244 may be written in an outer portion (i.e. between the continuous line of spots 242 and the edge of the DOTS recording medium 210) of the guide track 240 and diagonal lines 234 may be written in an inner portion (i.e. between the continuous line of sports 232 and the data 222) of the guide track 230. The asymmetry in the guide tracks 230, 240 may provide a visual reference of the "top" and "bottom" of the recording tape. In addition, the guide tracks 230, 240 may provide a visual reference of the intended direction of tape travel. For example, the diagonal lines 234, 244, if extended as shown by the dashed lines 238, form series of arrows pointing in the intended direction of tape travel.

As shown at 250, three columns of spots written across the entire width of the DOTS recording medium 210 may be used as a beginning of tape (BOT) marker, and two sets of three columns opposing each other and written across the guide tracks 230, 240 and dead bands 2236, 246, but not the central portion 220, may be used as a filemark to indicate both beginning of file (BOF) and end of file (EOF). The total number of spots written across the width of the DOTS recording medium can be determined by counting the number of spots in each column of the BOT marker. The number of data bits written across the central portion 220 of the width of the DOTS recording medium 210 can be determined by subtracting the number of spots in each column of the BOF/EOF filemarks from the number of spots in each column of the BOT marker.

The guide tracks 230, 240 are exemplary, and guide tracks for a digital optical recording medium may have different configurations of spots, lines, symbols, and other types of fiducial markers than those shown in FIG. 2. A digital optical recording medium may be written with two or more guide tracks. For example, one or more additional guide tracks (not shown) may be written in the central portion 220 of the digital optical tape recording medium. Additional guide tracks, when present, may be similar to or different from the guide tracks 230, 240 of FIG. 2.

Referring again to FIG. 1, the write controller 180 may synchronize the operation of the energy source 140 and the spatial light modulator 160. For example, the write controller 180 may transfer a line of data to the spatial light modulator 160 and then cause the energy source 140 to emit a pulse of energy. In this case, transferring or writing data to the spatial light modulator 160 and pulsing the energy source 140 may occur alternately. The write controller 180 may also control the operation of the motor 130 and/or tape transport 120 such that the DOTS recording medium 110 moves before, after, or during the transfer of data to the spatial light modular and the DOTS recording medium 110 is stationary while the energy source 140 emits each pulse of energy. Alternatively, if the duration of each pulse of energy is short compared to the time required to move the DOTS recording medium 110 by the distance between adjacent columns of data, the DOTS recording medium 110 may move continuously.

The write controller 180 may include a data formatter 182 to convert data to be recorded into the appropriate format for writing onto the DOTS recording medium 110. The data formatter 182 may encode the data to be written, for example using an 8 B/10 B or 64 B/66 B encoding. The data formatter 182 may add error detecting and/or error correcting codes to the data to be written. The data formatter 182 may format the data in some other manner. The data formatter may divide the formatted data into lines of data bits to be written onto the DOTS recording medium.

The write controller 180 may include a guide track generator 184 to generate the spots, lines, symbols, and other fiducial markers to be written onto the digital optical tape recording medium as guide tracks. The controller may include a data combiner 186 to combine the guide tracks and the formatted data such that each line of combined data 188 sent to the spatial light modulator 160 includes a block of data to be recorded and the corresponding portions of the two or more guide tracks.

The write controller 180 may include digital logic circuits, memories, processors, and other circuits configured to perform the functions described herein. All or portions of the functions of the write controller 180 may be implemented in hardware which may include one or more application specific integrated circuits and/or one or more programmable gate arrays. All or portions of functions of the write controller 180 may be implemented by software executed by one or more processors, such as a microprocessor, a graphics processor, or a digital signal processor.

Figure 3:
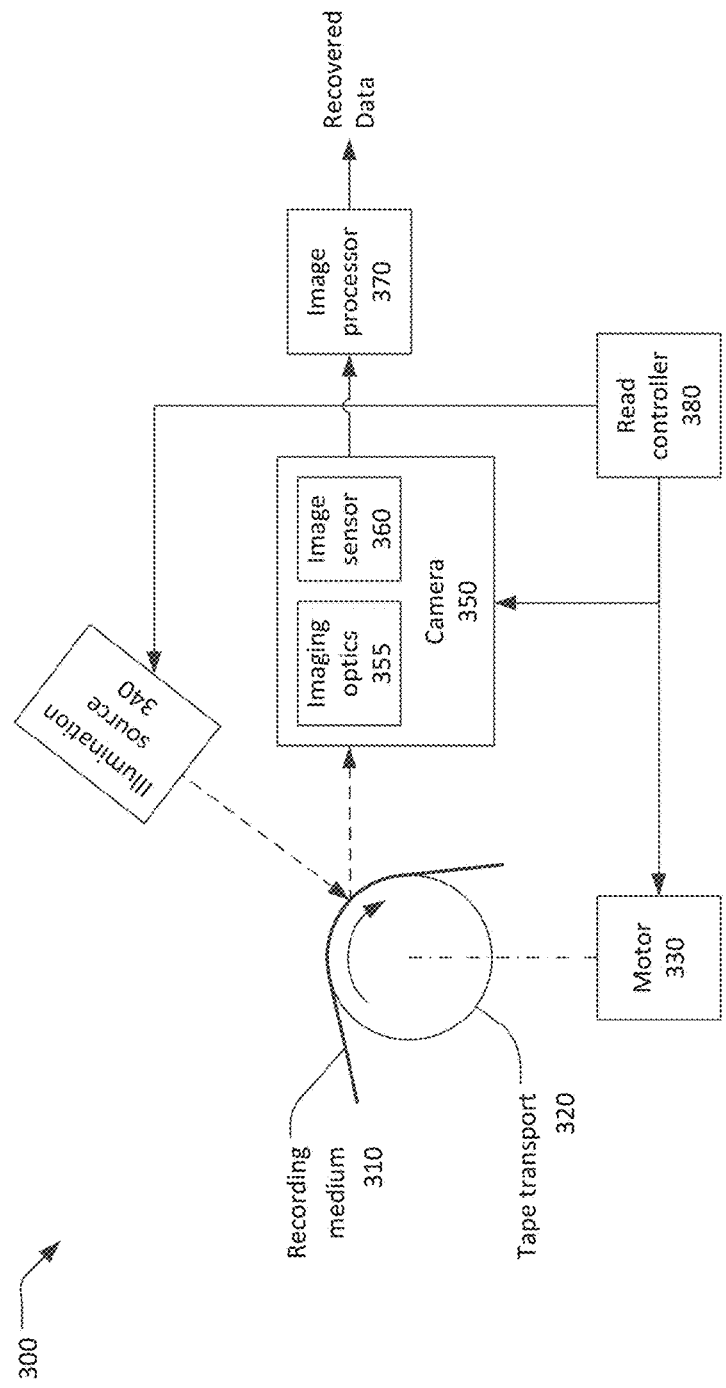
FIG. 3 is a schematic block diagram of a digital optical tape reading system.

Referring now to FIG. 3, a digital optical tape reader 300 may be used to recover data from a DOTS recording medium 310. The DOTS recording medium 310 may store digital data and two or more guide tracks. For example, the DOTS recording medium 310 may be, or may be similar to, the DOTS recording medium 210 of FIG. 2. The digital optical tape reader 300 may include an illumination source 340, a camera 350, and an image processor 370 to extract data from the image captured by the camera 350.

The DOTS recording medium 310 may be continuously or intermittently advanced by a tape transport 320 driven by at least one motor 330. The tape transport 320 is represented schematically in FIG. 3 as a capstan, but does not necessarily include a capstan. The tape transport 320 may include a supply tape reel, a take-up tape reel, and other components not shown in FIG. 3.

The illumination source 340 may be any pulsed or continuous light source suitable for reading the DOTS recording medium 310. The image sensor devices within the image sensor 360 may typically be fabricated from silicon, which exhibits peak photosensitivity in the near infrared portion of the electromagnetic spectrum and progressively lower photosensitivity at lower wavelengths in the visible spectrum. The illumination source 340 may provide light within the visible or near infrared portions of the electromagnetic spectrum. The illumination source 340 may provide broadband (e.g. white) light or narrow band light. The use of narrow band light, for example from a light emitting diode or laser, may simplify the design of the imaging optics 355 since broadband chromatic aberration correction may not be required with a narrow band light source. In general, the use of a lower wavelength may also simplify the design of the imaging optics 355 since the diffraction-limited spot size for a given lens numerical aperture is inherently smaller for a lower wavelength. However, silicon image sensors are less sensitive at the lower end of the visible spectrum. Thus the resolution benefit of a lower wavelength may be balanced against a possible need for higher illumination power to offset lower detector sensitivity.

The illumination source 340 may include one or more lenses, mirrors, and other optical elements to concentrate the illumination of the area of the DOTS recording medium 310 to be read. The illumination source 340 may include a polarizer or other optical elements to condition the illumination light to facilitate subsequent discrimination between light reflected from written and unwritten spots on the optical recording tape. The illumination source 340 may include one or more apodizers, integrators, or other optical elements to provide uniform illumination power density across the width of the DOTS recording medium 310.

The camera 350 may include imaging optics 355 and an image sensor 360. The imaging optics 355 may collect light from the illumination source 340 that is reflected from the DOTS recording medium 310 and project an image of the surface of the DOTS recording medium 310 onto the image sensor 360. When the image sensor 360 includes multiple image sensing devices, the imaging optics 355 may contain separate imaging optical elements for each image sensing device. The imaging optics 355 may include one or more apertures, filters, polarizers, other elements to discriminate between light reflected from written and unwritten spots on the optical recording tape.

The image sensor 360 may be a charge coupled device (CCD) sensor or a photodiode array sensor, of some other type of sensor. The image sensor 360 may include a one-dimensional or linear array of photosensitive detectors, a two dimensional array of photosensitive detectors, or may be a combination of two or more arrays of photosensitive detectors. The image sensor 360 may include internal electronics to convert the light level sensed by each detector into a serial signal or data stream.

The tape transport may continuously or incrementally move the DOTS recording medium 310 past the camera 350 such that the camera 350 captures a two-dimensional image of the surface of the DOTS recording medium 310. In this context, the term "capture" means to accumulate data representative of the two-dimensional image. The captured image may comprise an array of digital values, where each digital value represents the reflectivity of a corresponding picture element or "pixel". The captured image may include areas of the DOTS recording medium 310 that store data and two or more guide tracks. The camera 350 may capture the two-dimensional image of the surface of the DOTS recording medium 310 without requiring, or attempting, one-to-one alignment between individual data bits recorded on the DOTS recording medium 310 and individual photosensitive detectors within the image sensor 360.

The camera 350 may be configured to oversample the data recorded on the DOTS recording medium 310, which is to say the number of pixel values captured for a given portion of the DOTS recording medium 310 may be greater than the number of data bits written within that portion of the DOTS recording medium 310. For example, the linear density of the pixels (i.e. the number of pixels per unit length or width of the recording medium) may be at least twice the linear density of recorded data bits. Continuing the previous example, the image sensor 360 may include a linear array of 20,000 detectors to read 8192 bits of data and the adjacent portions of the two or more guide tracks in each column on the DOTS recording medium 310. The image sensor 360 may include two or more columns of detectors which may be aligned or staggered. The image sensor 360 may include two or more linear image sensor devices, each of which reads a different portion of the recording tape.

Figure 4:
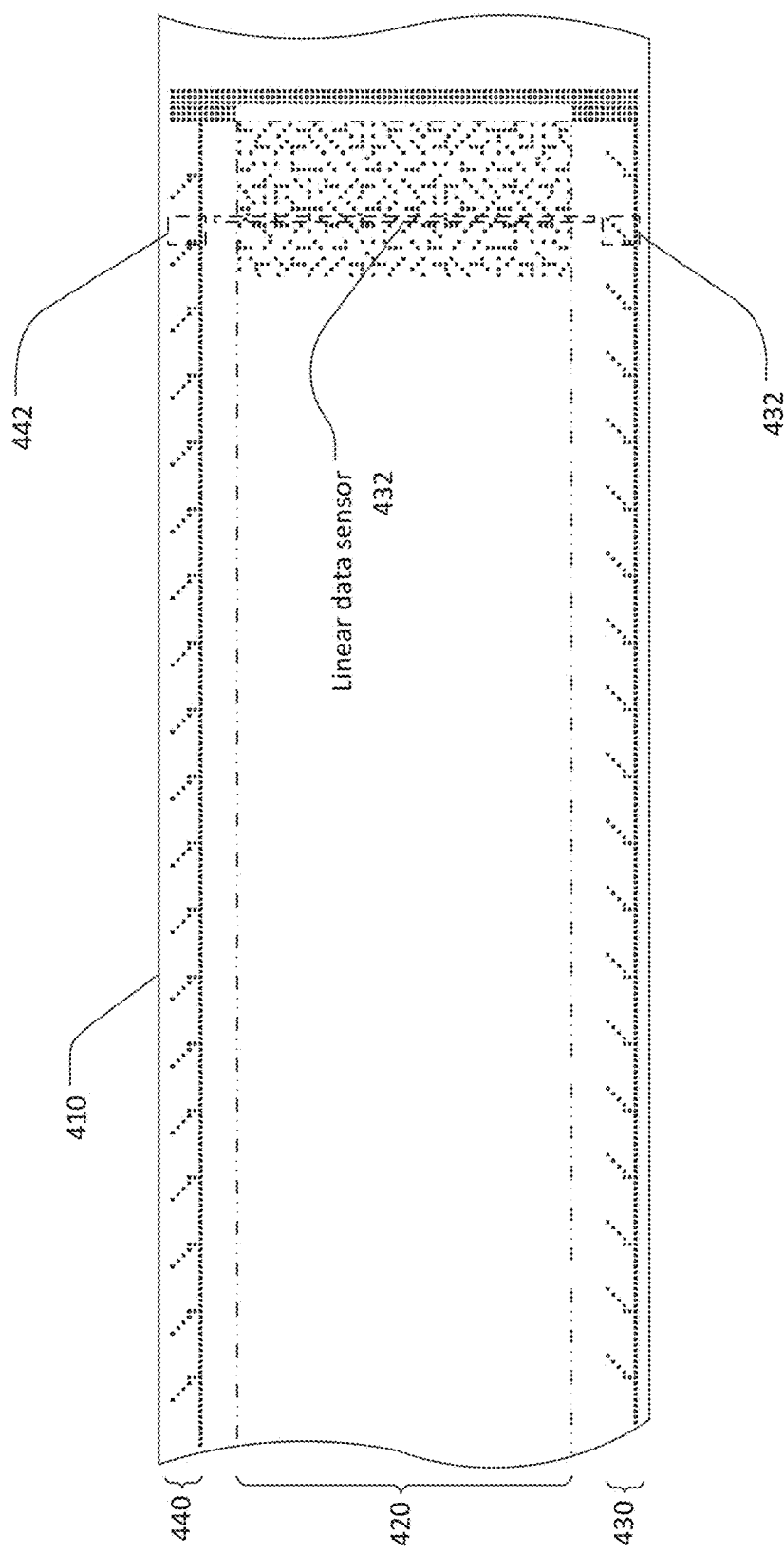
FIG. 4 is a schematic diagram illustrating the coverage of sensors used to read a digital optical tape.

The image sensor 360 may include one or more linear sensor device for sensing data recorded in a central portion of the DOTS recording medium 310, and separate image sensor devices for sensing the two or more guide tracks. The image sensor devices for sensing the guide tracks may include rectangular arrays of detectors. FIG. 4 shows the surface of an exemplary DOTS recording medium 410. A dashed rectangle 432 indicates an area of the DOTS recording medium 410 sensed by a linear image sensor. Two dashed rectangles 432, 442 indicate areas of the DOTS recording medium 410 along the guide tracks 430, 440 sensed by corresponding guide track image sensors. In this example, the linear image sensor may have about 16500 detectors to sense 8192 dots or bits of information recorded in each column of data on the DOTS recording medium 410. The two guide track image sensors may have a rectangular array of, for example, 512×512 detectors, 480×640 detectors, or some other number of detectors.

Referring back to FIG. 3, the image processor 370 may analyze a rolling window (i.e. a continuously or incrementally moving portion) of the image captured by the camera 350 to extract the data stored on the DOTS recording medium 310. The image processor 370 may be configured to extract the data based on the guide tracks. The image processor may extract the data using the processes that will be described subsequently.

The image processor 370 may include digital logic circuits, memories, processors, and other circuits configured to perform the functions described herein. All or portions of the functions of the image processor 370 may be implemented in hardware which may include one or more application specific integrated circuits and/or one or more programmable gate arrays. All or portions of functions of the image processor 370 may be implemented by software executed by one or more processors, such as microprocessors, graphics processors, and/or digital signal processors.

The function of the tape transport 330 and the camera 350 may be synchronized by a read controller 380. The linear density of captured pixels along the length of the recording medium may depend on the speed at which the DOTS recording medium 310 moves past the camera 350. The read controller 380 may control the operation of the motor 330 such that the DOTS recording medium 310 moves past the camera 350 at a rate that allows the camera 350 to capture the desired number of pixels per unit length. When the illumination source is a pulsed laser or other source configured to emit pulses of light, the read controller 380 may also synchronize the operation of the illumination source 340 and the camera 350. The read controller 380 may include digital logic circuits, memories, processors, and other circuits configured to perform the functions described herein. All or portions of the functions of the read controller 380 may be implemented in hardware. All or portions of functions of the read controller 380 may be implemented by software executed by one or more processors, such as a microprocessor or a digital signal processor. All or portions of the read controller 380 may be implemented in one or more application specific integrated circuits and/or one or more programmable gate arrays.

Description of Processes

Figure 5:
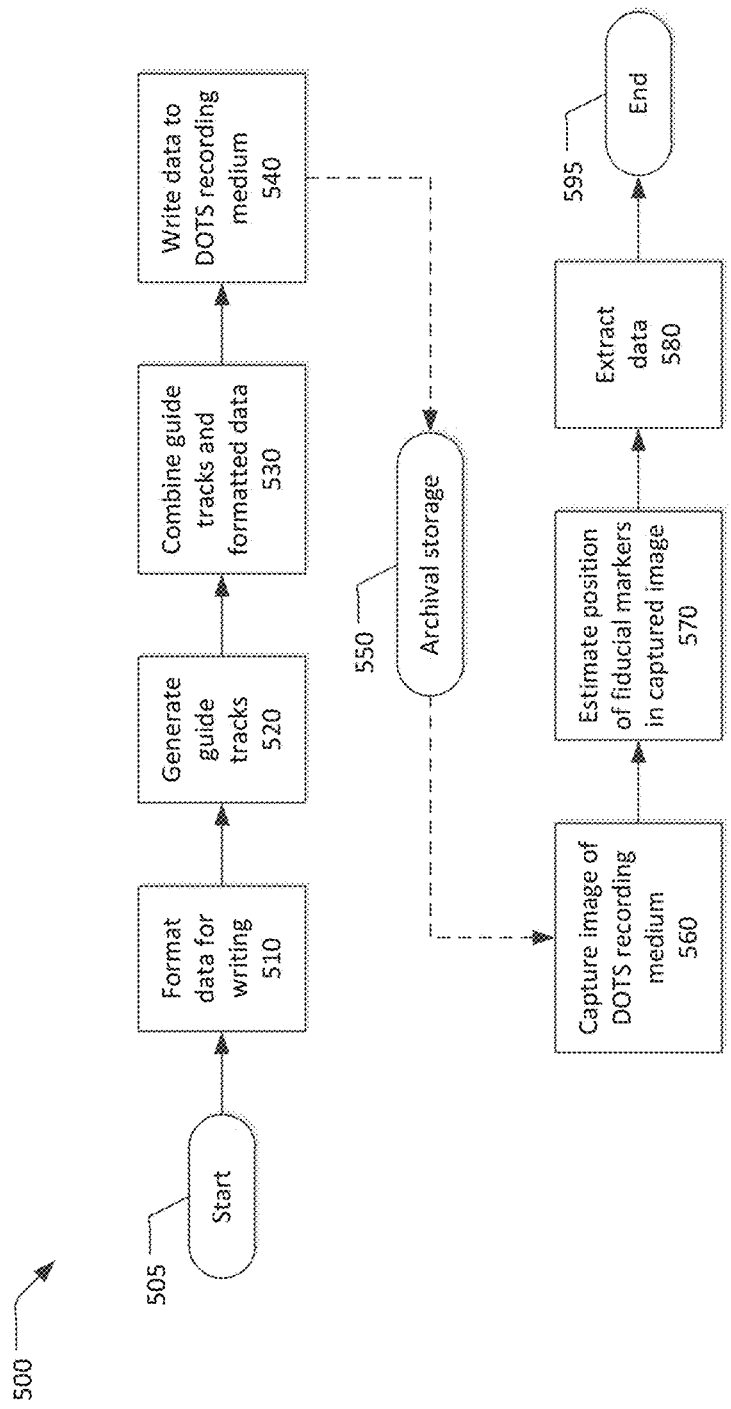
FIG. 5 is a flow chart of a process for recording and retrieving data on DOTS recording medium.

Referring now to FIG. 5, a process for archival storage on digital optical tape (DOTS) recording medium may begin at 505 and end at 595. The actions from 510 through 540 cause data to written onto the DOTS recording medium. The actions from 560 to 580 cause the recorded data to be retrieved from the DOTS recording medium. The actions at 540 and 560 may be separated by archival storage of the DOTS recording medium at 550 for an indeterminate period of time. In some circumstances it may be desirable to read the DOTS recording medium as it is being recorded to validate the recorded data. In this case the action at 560 may follow the action at 540 immediately without intervening storage.

Writing data onto the DOTS recording medium causes localized irreversible (at least on a bit-by-bit basis) phase changes in the recording material. Thus the actions from 510 to 540 may only be performed once on a given length of DOTS recording medium. The actions from 510 to 540 may be performed, for example, by the digital optical tape recorder 100 of FIG. 1.

At 510, data to be written onto DOTS recording medium may be formatted or converted into the appropriate format for writing onto the DOTS recording medium. Formatting the data may include encoding the data, for example using an 8 B/10 B or 64 B/66 B encoding. Formatting the data at 510 may include adding error detecting and/or error correcting codes to the data to be written. Formatting the data at 510 may include processing the data in some other manner. Formatting the data at 510 may include dividing the formatted data into lines of data to be written onto the DOTS recording medium.

At 520, guide tracks may be generated. Generating the guide tracks may include generating spots, lines, symbols, and other fiducial markers to be written onto the DOTS recording media for use as a reference when data recorded on the DOTS recording medium is read. At 530, the guide tracks generated at 520 may be combined with the formatted data form 510 such that each line of combined data to be written onto the DOTS recording medium includes a block of formatted data adjacent portions of two or more guide tracks. The combined data may then be written onto the DOTS recording medium at 540 using an apparatus such as that shown in FIG. 1.

The actions from 510 to 540 may be performed sequentially, with each action completed before the subsequent action is initiated. More efficiently, the actions from 510 to 540 may be performed as a continuous pipeline, such that some or all of the actions from 510 to 540 proceed simultaneously, processing different lines of data to be written onto the DOTS recording medium.

Reading data from DOTS recording material does not alter the recorded data or the material. Thus the DOTS recording material can be read repeatedly, and the actions from 560 to 580 may be performed multiple times for any given length of DOTS recording medium. The actions from 560 to 580 may be performed, for example, by the digital optical tape reader 300 of FIG. 3.

At 560, a two-dimensional image of a surface of the DOTS recording medium may be captured by a camera. As described in conjunction with FIG. 3, the camera may include a lens that forms an image of the surface of the DOTS recording medium on a linear or two-dimensional photosensitive detector array. The DOTS recording medium may be continuously or incrementally moved past the camera such that the camera captures the two dimensional image. The camera may be configured to oversample the data recorded on the DOTS recording medium, which is to say a linear density of pixels captured by the camera across a width and along a length of the DOTS medium may be greater than or equal to two times a linear density of data bits recorded on the DOTS medium. The two-dimensional image may be captured at 560 by the camera without requiring or attempting one-to-one alignment between individual detectors within the camera and individual data bits stored on the DOTS optical medium.

Figure 6:
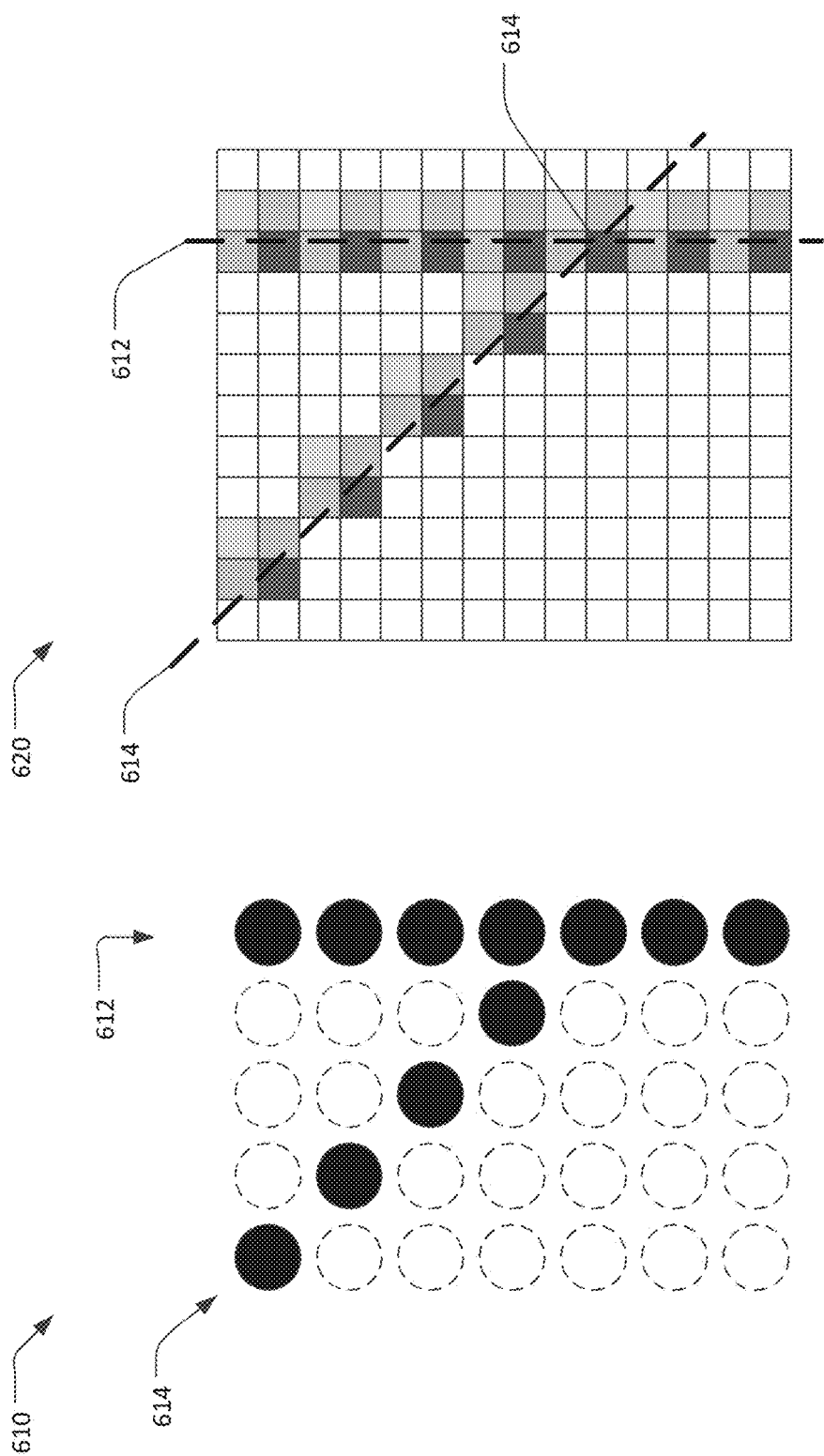
FIG. 6 is a graphical representation of estimating a position of a fiducial marker.

The two dimensional image captured by the camera at 560 may include recorded data and two or more guide tracks, such as the guide tracks 230, 240 shown in FIG. 2. At 570, an image processor may analyze the two-dimensional image captured by the camera at 560 to estimate positions of fiducial markers within the two or more guide tracks. FIG. 6 is graphical representation of estimating the location of a fiducial marker. The left-hand graphic 610 is an enlarged portion of the guide track 240 which includes a continuous line of spot 612 along the length of a DOTS recording medium (the direction of travel of the DOTS medium is vertical in FIG. 6) and a diagonal line of spots 614. The right-hand graphic is a representation of the corresponding portion of a two-dimensional image captured by a camera. Since the camera is not precisely aligned to the data spot positions on the DOTS recording medium, and since the camera oversamples the data, each spot of the continuous line of spots and the diagonal lines of spot is spread over several pixels in the two-dimensional image. However, line-detection image processing techniques can be applied to estimate positions 612, 613 for the continuous lines of spots and the diagonal line of spots, respectively. Once the positions of both lines are estimated, the intersection of the two lines 614 may be determined to sub-pixel accuracy. The intersection 614 may be used as a fiducial marker during extraction of the data recorded on the DOTS medium.

Referring back to FIG. 5, at 580, data stored on the DOTS medium may be extracted based on the positions of fiducial markers estimated at 570. For example, a local coordinate system may be defined based on the estimated positions of the fiducial markers, and the data may be extracted based on the defined coordinate system.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of" respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A digital optical tape reader comprising:
   a camera to capture a two-dimensional image of a digital optical tape recording medium including data and two or more guide tracks, wherein the guide tracks include fiducial markers along a length of the digital optical tape recording medium, and
   an image processor to:
      estimate positions of the fiducial markers in the two-dimensional image captured by the camera,
      define a local coordinate system based on the estimated positions of the fiducial markers, and
      extract the data based on the defined coordinate system.

2. The digital optical tape reader of claim 1, wherein the camera is configured to oversample the data such that a linear density of picture elements in the two-dimensional image captured by the camera is at least double a linear density of bits in the data on the digital optical tape recording medium.

3. The digital optical tape reader of claim 1, wherein the fiducial markers are at periodic intervals along the length of the digital optical tape recording medium.

4. The digital optical tape reader of claim 1, wherein the image processor processes the two-dimensional image based, at least in part, on positions of the guide tracks within the two-dimensional image.

5. The digital optical tape reader of claim 1, wherein the data and the two or more guide tracks form lines of data bits on the digital optical tape recording medium, each line including a block of data and a corresponding portion of each of the two or more guide tracks.

6. The digital optical tape reader of claim 1, wherein the camera is configured to capture the two-dimensional image without alignment between data bits of the two-dimensional image and detectors in the camera.

7. A method for retrieving data from a digital optical tape recording media, comprising:
    capturing a two-dimensional image of the digital optical tape recording medium with a camera, the two-dimensional image including the data and two or more guide tracks, wherein the guide tracks include fiducial markers along a length of the digital optical tape recording medium,
    estimating the positions of the fiducial markers in the two-dimensional image captured by the camera,
    defining a local coordinate system based on the estimated positions of the fiducial markers, and
    extracting the data based on the defined coordinate system.

8. The method of claim 7, wherein
    the camera is configured to oversample the data such that a linear density of picture elements in the two-dimensional image captured by the camera is at least double a linear density of bits in the data recorded on the digital optical tape recording medium.

9. The method of claim 7, wherein
    the fiducial markers are at periodic intervals along the length of the digital optical tape recording medium.

10. The method of claim 9, wherein capturing the two-dimensional image includes capturing the two-dimensional image without alignment between data bits of the two-dimensional image and detectors in the camera.

11. The method of claim 7, further comprising:
    processing the two-dimensional image, at least in part, on positions of the guide tracks within the two-dimensional image.

12. The method of claim 7, wherein the data and the two or more guide tracks form lines of data bits on the digital optical tape recording medium, each line including a block of data and a corresponding portion of each of the two or more guide tracks.

* * * * *